(12) United States Patent
Kurata et al.

(10) Patent No.: US 8,535,625 B2
(45) Date of Patent: Sep. 17, 2013

(54) ADSORBENT AND METHOD OF COLLECTING PRECIOUS METAL USING THE SAME

(75) Inventors: Minoru Kurata, Nagoya (JP); Kinya Atsumi, Okazaki (JP); Hiroaki Fukuda, Obu (JP); Katsutoshi Inoue, Saga (JP); Keisuke Ohto, Saga (JP); Hidetaka Kawakita, Saga (JP)

(73) Assignees: Denso Corporation, Kariya (JP); Saga University, Saga (JP)

( * ) Notice: Subject to any disclaimer, the term of this patent is extended or adjusted under 35 U.S.C. 154(b) by 0 days.

(21) Appl. No.: 13/403,378

(22) Filed: Feb. 23, 2012

(65) Prior Publication Data

US 2012/0219479 A1    Aug. 30, 2012

(30) Foreign Application Priority Data

Feb. 24, 2011    (JP) .................... 2011-039071

(51) Int. Cl.
*C22B 3/00* (2006.01)

(52) U.S. Cl.
USPC .................. 423/22; 423/25; 502/404

(58) Field of Classification Search
USPC .................... 502/404; 423/22, 25
See application file for complete search history.

(56) References Cited

U.S. PATENT DOCUMENTS

| 7,311,842 B2 | 12/2007 | Kim |
| 7,758,756 B2 | 7/2010 | Kim |
| 7,857,888 B2 | 12/2010 | Niisawa et al. |

FOREIGN PATENT DOCUMENTS

| CN | 101424635 | 5/2009 |
| GB | 654695 | 6/1951 |
| GB | 715120 | 9/1954 |
| JP | 2006-348359 | 12/2006 |
| RU | 2 175 679 | 11/2001 |
| WO | WO 2007/023002 | 3/2007 |
| WO | 2007/080963 | * 7/2007 |

OTHER PUBLICATIONS

B.F. Rimmer, "Refining of Gold From Precious Metal Concentrates by Liquid-Liquid Extraction", Chemistry & Industry, Jan. 19, 1974, No. 2, pp. 63-66.
H. Kawakita, K. Inoue, K. Ohta, K. Itayama, D. Parajuli, "Preparation of Amine-Type Adsorbent Using Wastepaper and Adsorption of Metal Ions", Waste Management Research 17(3), May 31, 2006, pp. 243-249.
Zeliyha Celik et al., "Journal of Hazardous Materials" 174 (2010), pp. 556-562.
E. Guibal et al., "Reactive & Functional Polymers", 50 (2002) pp. 149-163.
Search Report dated Jun. 22, 2012 in corresponding GB Application No. 1203220.7.
A.A. Abia et al, "Transfer Zone Behaviour of As(III), Co(II) and Mn(II) Ions on Sulphur-hydryl Infused Cellulose Surface", African Journal of Biotechnology vol. 6(3), pp. 285-289, Feb. 5, 2007.
B. Pangeni et al, "Selective Recovery of Gold (III) Using Cotton Cellulose Treated With Concentrated Sulfuric Acid", Cellulose (2012)19:381-391; Received Jul. 17, 2011; Accepted Nov. 23, 2011; Published Online Dec. 14, 2011.

* cited by examiner

*Primary Examiner* — Steven Bos
(74) *Attorney, Agent, or Firm* — Harness, Dickey & Pierce, PLC (57) ABSTRACT

An adsorbent contains a carbohydrate having an ether linkage. Alternatively, an adsorbent contains a carbohydrate having a cross-linkage formation produced by a dehydration reaction using a strong acid. In collection of a precious metal using the adsorbent, the adsorbent selectively adsorbs a precious metal dissolved in a solution.

6 Claims, 7 Drawing Sheets

GOLD PARTICLES

FIG. 10B

GOLD PARTICLES

ADSORBENT AND METHOD OF COLLECTING PRECIOUS METAL USING THE SAME

CROSS REFERENCE TO RELATED APPLICATION

This application is based on Japanese Patent Application No. 2011-39071 filed on Feb. 24, 2011, the disclosure of which is incorporated herein by reference.

TECHNICAL FIELD

The present disclosure relates to an adsorbent and a method of collecting a precious metal using the adsorbent.

BACKGROUND

Gold has been widely used as a plating material, electric and electronic materials, a medical material and the like, besides jewelry. As gold is expensive, it has been desired to collect gold from various kinds of wastage or waste fluid. However, the quantity of gold contained in the wastage is small, and it is difficult to selectively separate and collect gold from other metals which exist in large amounts.

In a conventional method of collecting gold from various kinds-of solid wastage, the solid is dissolved in aqua regia, and gold is collected from the solution by a metal substitution technique or the like. However, since the regulation on nitrogen in drainage has been recently tightened, the collection using the aqua regia is getting difficult to implement.

The following methods have been also proposed as methods of separating and collecting precious metals:

(a) Solvent Extraction Method and Ion Exchange Method

A solvent extraction method and an ion exchange method have been recently adopted as methods for collecting precious metals from an anode slime which is generated in an electrolytic smelting of copper, nickel and the like. In such a collecting process, after metals are completely dissolved in hydrochloric acid containing chlorine gas, the metals are individually collected by the solvent extraction method or the ionic exchange method.

With regard to the collection of gold, a solvent extraction method using dibutyl carbitol is adopted in many countries including Japan. Such a solvent extraction method is, for example, described in detail in non-patent document 1 listed below.

(b) Method Using Chemically-Modified Cellulose

Chemical modification of cellulose has been widely researched, and many adsorbents have been put into practice for analytical chemistry and medical use. For example, non-patent document 2 listed below describes cellulose in detail.

For example, the cellulose in which various functional groups, such as a diethylaminoethyl (DEAE) group, is introduced by chemical modification is used for separation and refinement of biogenic substances, such as an enzyme, a plasma component, and other functionality protein materials.

Moreover, there are some researches regarding collection of precious metals contained in various waste fluids and wastage using adsorbents prepared by chemical modification of a cellulose-base material such as paper. For example, non-patent document 3 listed below reports an adsorbent in which a primary amino group is fixed by the chemical modification of wastepaper.

<Non-Patent Document 1>
B. F. Rimmer, "Refining of gold from precious metal concentrates by liquid-liquid extraction", Chemistry & Industry, Jan. 19, 1974, No. 2, pp. 63-66

<Non-Patent Document 2>
"Dictionary of cellulose", pp. 131-165, "4.2 Chemical reaction of cellulose and derivative", and pp. 539-545, "7.5.4 Ion exchange material", Cellulose Society of Japan <Non-Patent Document 3>
KAWAKITA Hidetaka, INOUE Katsutoshi, OHTO Keisuke, ITAYAMA Kyoko, PARAJULI Durga, "Preparation of Amine-Type Adsorbent Using Wastepaper and Adsorption of Metal Ions", Waste Management Research 17(3), May 31, 2006, pp. 243-249

SUMMARY

It is an object of the present disclosure to provide an adsorbent, which can efficiently separate and collect a precious metal contained in a solution. It is another object of the present disclosure to provide a method of collecting a precious metal from a solution.

An adsorbent according to an aspect contains a carbohydrate having an ether linkage.

In collection of a precious metal using the adsorbent, the adsorbent selectively adsorbs a precious metal contained in a solution. Therefore, a precious metal in the solution can be selectively and efficiently separated and collected from the solution.

For example, a precious metal, such as gold, can be efficiently collected from a solution, such as aqua regia or hydrochloric acid solution in which wastage containing precious metals, such as gold, platinum and palladium, and base metals, such as iron, is dissolved.

An adsorbent according to another aspect contains a carbohydrate having a cross-linkage formation produced by a dehydration reaction.

In collection of a precious metal using the adsorbent, the adsorbent selectively adsorbs a precious metal contained in a solution. Therefore, a precious metal in the solution can be selectively and efficiently separated and collected from the solution.

For example, a precious metal, such as gold, can be efficiently collected from a solution, such as aqua regia or hydrochloric acid solution in which wastage containing precious metals, such as gold, platinum and palladium, and base metals, such as iron, is dissolved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In a solvent extraction using dibutyl carbitol (e.g., the above-described method (a)), precious metals other than gold and base metals are extracted, in addition to gold, depending on conditions. Therefore, multistage extraction and back extraction operations are required, resulting in an increase in the cost of separation and refining. In addition, the dibutyl carbitol is considerably soluble in water, resulting in an increase in the cost of waste water treatment.

With regard to the above-described method (b), the chemically-modified cellulose used in the technology of the non-patent document 2 is generally expensive. Further, in preparation of the chemically-modified cellulose used in the technology of the non-patent document 2, many poisonous organic chemicals, such as epichlorohydrin and glutaraldehyde, are used, resulting in an increase in cost of safe treatment of the organic chemicals which remains after the preparation.

Moreover, according to the technology of the non-patent document 3, in the above-described method (b), although gold, platinum, and palladium are adsorbed and collected from hydrochloric acid, an amount of copper as the base metal is also adsorbed.

In view of the foregoing matters, the following adsorbents are achieved as adsorbents which can efficiently separate and collect a precious metal, such as gold, from a solution, such as aqua regia or hydrochloric acid in which wastage containing gold is dissolved.

In an embodiment, an adsorbent contains a carbohydrate having an ether linkage. In collection of a precious metal using the adsorbent, the adsorbent selectively adsorbs a precious metal contained in a solution. Therefore, a precious metal dissolved in the solution can be selectively and efficiently separated and collected from the solution.

For example, a precious metal, such as gold, can be efficiently collected from a solution, such as aqua regia or hydrochloric acid solution, in which wastage containing precious metals, such as gold, platinum and palladium, and base metals, such as iron, is dissolved. Further, the adsorbent can be produced without using expensive organic chemicals.

The above-described ether linkage can be formed by processing a carbohydrate, such as pure cellulose gel, with a strong acid, such as concentrated sulfuric acid or concentrated hydrochloric acid, at a high temperature, such as a temperature not less than 70 degrees Celsius (° C.), for example, 100° C., to thereby form a cross-linkage by a dehydration reaction.

In an embodiment, an adsorbent contains a carbohydrate having a cross-linkage formation produced by a dehydration condensation reaction.

In collection of a precious metal using the adsorbent, the adsorbent selectively adsorbs a precious metal contained in a solution. Therefore, a precious metal in the solution can be selectively and efficiently separated and collected from the solution.

For example, a precious metal, such as gold, can be efficiently collected from a solution, such as aqua regia or hydrochloric acid solution, in which wastage containing precious metals, such as gold, platinum and palladium, and base metals, such as iron, is dissolved. Further, the adsorbent can be produced without using expensive organic chemicals.

The carbohydrate of the above-described adsorbents is cellulose, for example. The cellulose includes at least one of cotton, hemp and paper, for example.

A precious metal dissolved in a solution can be collected by adsorbing the precious metal to the above-described adsorbents.

To remove the precious metal from the adsorbent, for example, the adsorbent to which the precious metal has been adsorbed is burned, and a desired precious metal is removed from the ashes.

In this case, the burning of the adsorbent advances readily, as compared with a plastic resin such as a chelating resin and an ion exchange resin. Therefore, the precious metal is easily collected.

Hereinafter, the embodiments will be described more in detail referring to various examples.

<Preparation of Adsorbent>

The adsorbent is easily prepared by heating and mixing a cellulose-base material, such as pure cellulose gel, with concentrated sulfuric acid for six hours or more at a temperature equal to or greater than 70 degrees Celsius (° C.).

In place of the above-described cellulose gel, another cellulose-base material may be processed in the similar manner. Alternatively, in addition to the cellulose gel, another cellulose-base material may be processed together in the similar manner.

As examples of the cellulose-base material other than the pure cellulose gel, cotton such as cotton products or old cotton clothes, hemp such as hemp fiber waste, paper such as wastepaper, are adopted.

For example, an adsorbent A is produced by processing a cellulose gel (e.g., 102330 Cellulose microcrystalline (Merck) distributed for thin-layer chromatography) with concentrated sulfuric acid in the above-described manner.

Figure 1:
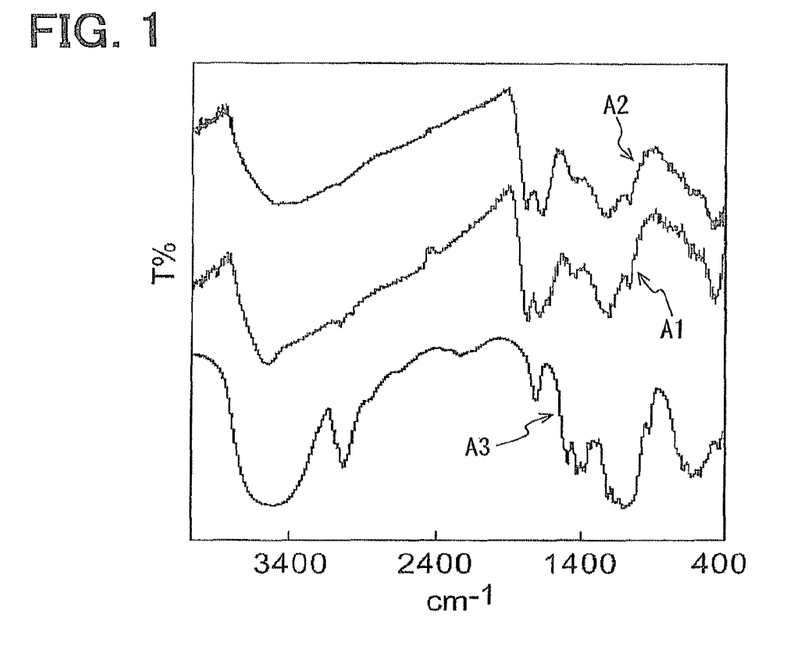
FIG. 1 is a diagram illustrating infrared absorption spectrums of a cellulose processed with concentrated sulfuric acid, a cellulose processed with concentrated sulfuric acid and to which gold(III) ions are adsorbed, and a raw material, according to an embodiment.

FIG. 1 illustrates an infrared absorption spectrum A1 of the adsorbent A. Also, in FIG. 1, A2 represents an infrared absorption spectrum of the adsorbent A to which gold (III) ions are adsorbed, and A3 represents an infrared absorption spectrum of a raw material, that is, cellulose gel of 102330 cellulose microcrystalline, which is not processed with concentrated sulfuric acid. In FIG. 1, the horizontal axis represents a wave number and the vertical axis represents an absorbance.

With regard to the raw material, broad absorption around 3450 cm$^{-1}$ is caused by stretching vibration of O—H, and sharp absorption at 3050 cm$^{-1}$ is caused by stretching vibration of C—H. Also, sharp absorption at 1720 cm$^{-1}$ is caused by stretching vibration of C=O, and broad absorption centering on 1100 cm$^{-1}$ is caused by stretching vibration of C—O as well as deformation vibration of alcoholic O—H.

With regard to the cellulose processed with the concentrated sulfuric acid, the intensity of absorption caused by the stretching vibrations of O—H and C—H is degraded, and the cause thereof is considered because of a dehydration condensation cross-linkage reaction by the concentrated sulfuric acid. Also, absorption at 1200 cm$^{-1}$ is caused by stretching vibration of C—O—C which is produced by the dehydration condensation cross-linkage reaction. As such, it is considered that the hydroxyl group is changed to C—O—C (ether linkage) as a result of the dehydration condensation cross-linkage reaction.

In the cellulose processed with the concentrated sulfuric acid, further, sharp absorption is found at 1780 cm$^{-1}$ and at 1690 cm$^{-1}$. The sharp absorption at 1780 cm$^{-1}$ is caused by stretching vibration of C=O which is produced by partial oxidation of the hydroxyl group of a pyranose ring. The sharp absorption at 1690 cm$^{-1}$ is caused by stretching vibration of C=O of a carboxyl group.

As described above, it is considered that the processing of the cellulose with the concentrated sulfuric acid causes the partial oxidation of the hydroxyl group.

With regard to the cellulose to which gold(III) ions are adsorbed, absorption caused by an acid group is broad, and is shifted to a low wave number range around 3410 cm$^{-1}$. Thus, it is considered that the hydroxyl group is also participated in the coordination of the gold(III) ions. The intensity of absorption caused by C=O at 1690 cm$^{-1}$ is increased after the adsorption of the gold(III) ions, and the cause thereof is considered as —COOH group is generated due to the adsorption of the gold(III) ions.

<Adsorption and Collection of Precious Metal>

Hereinafter, examples are described with regard to an evaluation of adsorption of various kinds of metal ion to the above-described adsorbent A in hydrochloric acid by a batch method.

In this case, as a precious metal solution, a solution prepared by dissolving chloroauric(III) acid, chloroplatinic(IV) acid, and palladium(II) chloride as special grade chemicals in hydrochloric acid is used. Also, as a base metal solution, a solution prepared by dissolving hydrochlorides of copper(II) and zinc(II) in hydrochloric acid is used.

<Influence of Hydrochloric Acid Concentration on Adsorption of Various Kinds of Metal Ion>

10 mg in dry weight of the adsorbent A and 10 mL of hydrochloric acid of various concentrations, each containing respective metal ions of the concentration of 0.1 mmol/L are put in flasks with plugs, and shaken for 24 hours in an air thermostatic reservoir kept at 30° C. to carry out adsorption. An adsorption percentage of each metal ion adsorbed to the adsorbent A is calculated by measuring the concentration of the metal ion in the aqueous solution before and after the adsorption using an ICP emission spectrometer, (e.g., Spectrometer ICPS-8100 of SHIMADZU Corporation). The adsorption percentage is given based on the following equation:

Adsorption percentage=(metal concentration in the aqueous solution before the adsorption−metal concentration in the aqueous solution after the adsorption)/(metal concentration in the aqueous solution before the adsorption)×100

Figure 2:
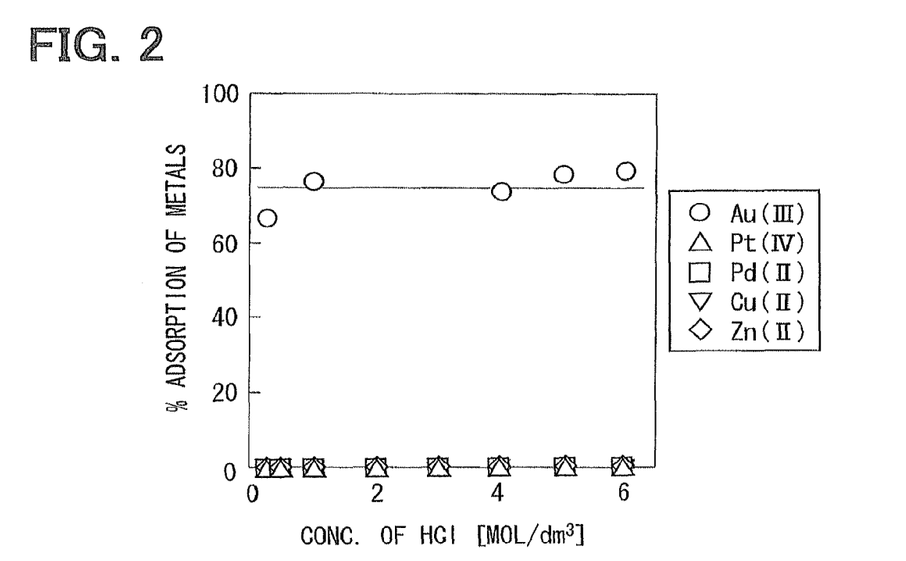
FIG. 2 is a graph illustrating a relationship between an adsorption percentage of gold ions and a concentration of hydrochloric acid when an adsorbent A of 102330 cellulose processed with a concentrated sulfuric acid is used, according to the embodiment.

FIG. 2 is a graph illustrating a relationship between the concentration of hydrochloric acid (horizontal axis) and the adsorption percentage (vertical axis) of metal ions, when the adsorbent A of the cellulose 102330 processed with concentrated sulfuric acid is used.

The detailed conditions are as follows:
First concentration of metal ion: 0.1 mmol/L
Volume of the metal solution: 10 mL
Dry weight of the adsorbent A: 10 mg
Shaking time: 48 hours
Temperature: 30° C.

As shown in FIG. 2, although gold is adsorbed not less than 70% in substantially entire range of the hydrochloric acid concentration, adsorption of all other metals can be disregarded. Precious metals other than gold and the base metal ions are not adsorbed at all. Therefore, it is appreciated that only gold can be selectively separated and collected from other metal ions by using the adsorbent A.

Figure 3:
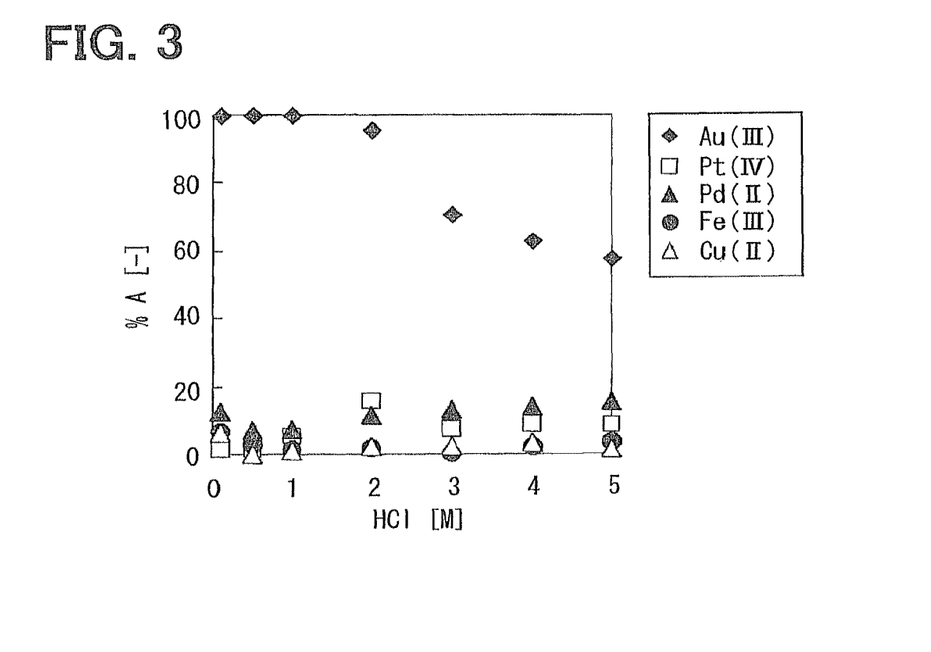
FIG. 3 is a graph illustrating a relationship between an adsorption percentage of gold ions and a concentration of hydrochloric acid when an adsorbent B of cotton processed with concentrated sulfuric acid is used, according to the embodiment.

FIG. 3 is a graph illustrating a relationship between the adsorption percentage (vertical axis) of some metal ions and the hydrochloric acid concentration (horizontal axis), when an adsorbent B is used. The adsorbent B is prepared by processing nonwoven fabric of pure absorbent cotton (e.g., COTTON CIEGAL of CHIYODA CO., LTD.) with concentrated sulfuric acid.

In the preparation of the adsorbent B, the pure cotton is processed with concentrated sulfuric acid in a similar processing condition to that of the adsorbent A. Also, the adsorption percentage of the case of the adsorbent B is calculated in the similar manner to that of the case of the adsorbent A.

The detailed test conditions are as follows:
First concentration of metal ion: 0.2 mmol/L
Volume of the metal solution: 10 mL
Dry weight of the adsorbent B: 10 mg
Shaking time: 24 hours
Temperature: 30° C.

As shown in FIG. 3, although a small mount of palladium (II) and a small amount of platinum(IV) are adsorbed, the base metals, such as iron and copper, are not adsorbed. On the other hand, gold(III) is adsorbed almost quantitatively in a range where the concentration of the hydrochloric acid is equal to or less than 2M.

Figure 4:
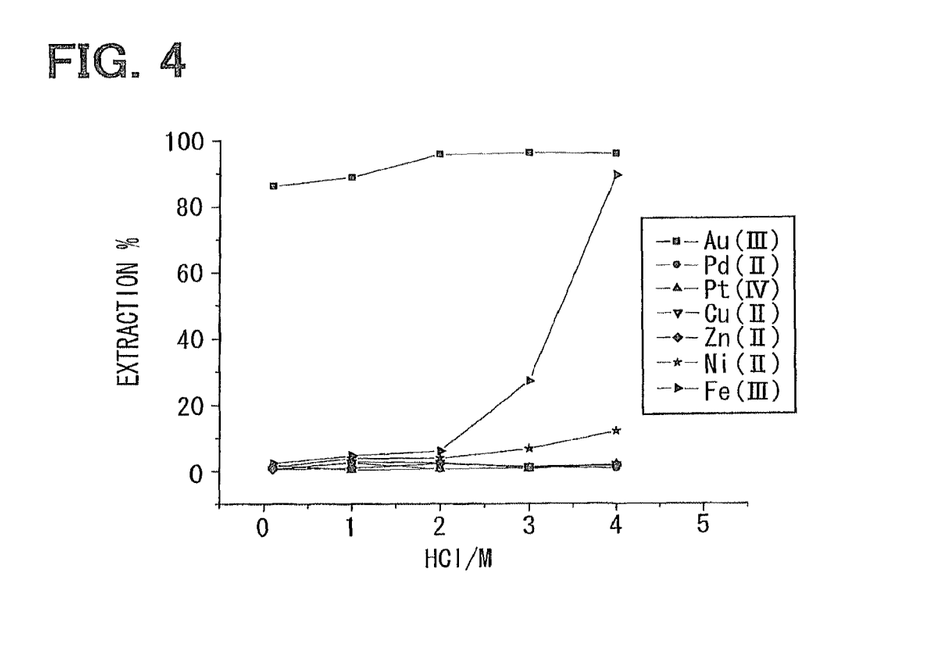
FIG. 4 is a graph illustrating a relationship between an adsorption percentage of respective metals and a concentration of hydrochloric acid in a solvent extraction using undiluted dibutyl carbitol, as a comparative example.

FIG. 4 illustrates a relationship between the extraction percentage (vertical axis) of metals and the concentration of hydrochloric acid in a solvent extraction using undiluted dibutyl carbitol as a comparative example.

The detailed test conditions are as follows:
First concentration of metal ion: 0.2 mM
Shaking velocity: 138 rpm
Shaking time: 98 hours
Temperature: 30° C.
Organic-phase volume: 10 mL
Aqueous-phase volume: 10 mL As shown in FIG. 4, in a range where the concentration of hydrochloric acid is equal to or greater than 2M, extraction of iron(III) increases and thus the selectivity of gold noticeably reduces.

Figure 5:
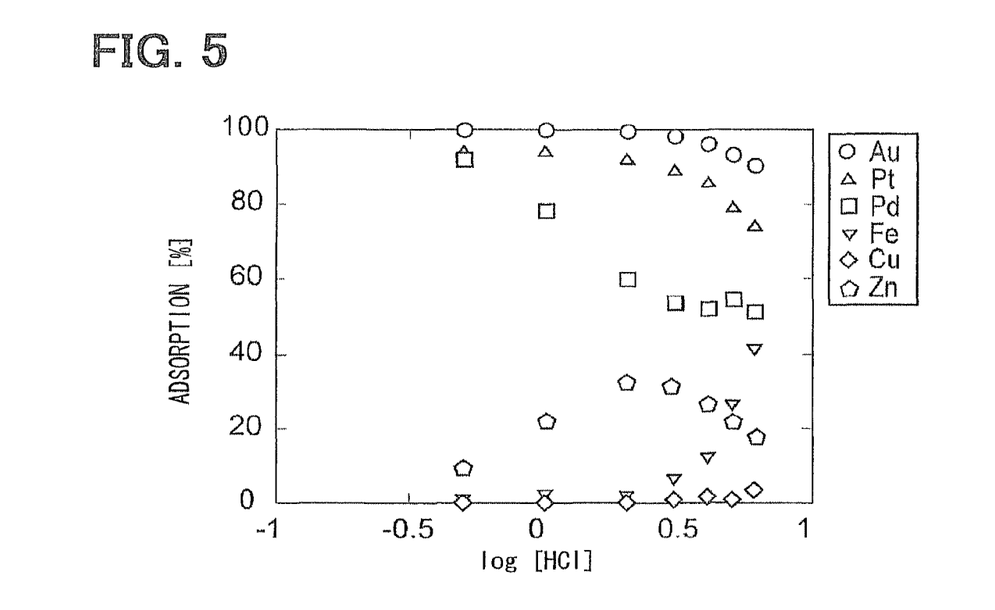
FIG. 5 is a graph illustrating a relationship between an adsorption percentage of respective metal ions and a concentration of hydrochloric acid, when a commercially available weakly basic ion exchange resin DIAION WA30 with a functional group of dimethylamine is used, as a comparative example.

FIG. 5 is a graph illustrating a relationship between the adsorption percentage (vertical axis) of metal ions and the concentration of hydrochloric acid (horizontal axis) of various kinds of metal ion in a case where commercially available weakly basic ion exchange resin (e.g., DIAION WA30) containing a functional group of dimethylamine is used, as a comparative example.

The detailed test conditions are as follows:
First concentration of metal ion: 15 mg/L
Volume of the metal solution: 15 mL
Dry weight of an adsorbent: 20 mg
Shaking time: 24 hours
Temperature: 30° C.

As shown in FIG. 5, different from the cases using the above-described cellulose-base adsorbents A, B, platinum (IV) and palladium(II) are adsorbed with the similar amount, in addition to gold(III). Further, zinc as the base metal is adsorbed approximately 30%, and iron is adsorbed approximately 40% in a high concentration region of the hydrochloric acid.

Accordingly, it is appreciated that the cellulose-base adsorbents A, B of the embodiment have favorable selectivity of gold, as compared with the commercially available adsorbent.

<Adsorption Isotherm>

Figure 6:
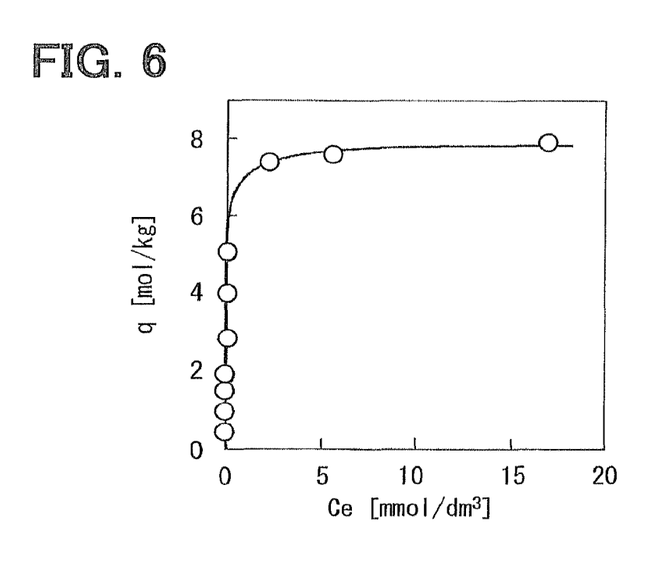
FIG. 6 is a graph illustrating an adsorption isotherm of gold(III) at 30 degrees Celsius, when the adsorbent A of cellulose processed with the concentrated sulfuric acid is used, according to the embodiment.

FIG. 6 is a graph illustrating an adsorption isothermal line of gold(III) at 30° C. of a case where the adsorbent A of the cellulose processed with the concentrated hydrochloric acid is used. That is, FIG. 6 is a graph illustrating a relationship between the amount of adsorption of gold (vertical axis) and a concentration of gold (horizontal axis) after the adsorption.

The detailed test conditions are as follows:
Hydrochloric acid concentration: 0.1 mol/L
Volume of hydrochloric acid: 10 mL
Weight (dry weight) of the adsorbent A: 10 mg
Shaking time: 150 hours
Temperature: 30° C.

As shown in FIG. 6, the adsorption isothermal line indicates Langmuir-type adsorption. The saturation amount of gold adsorbed to the adsorbent A is calculated 8 mol/kg based on the value of the amount of adsorption in a range where the amount of adsorption is fixed regardless of the concentration. This results indicates that 1.6 kg of gold is adsorbed to 1 kg of the adsorbent A.

Figure 7:
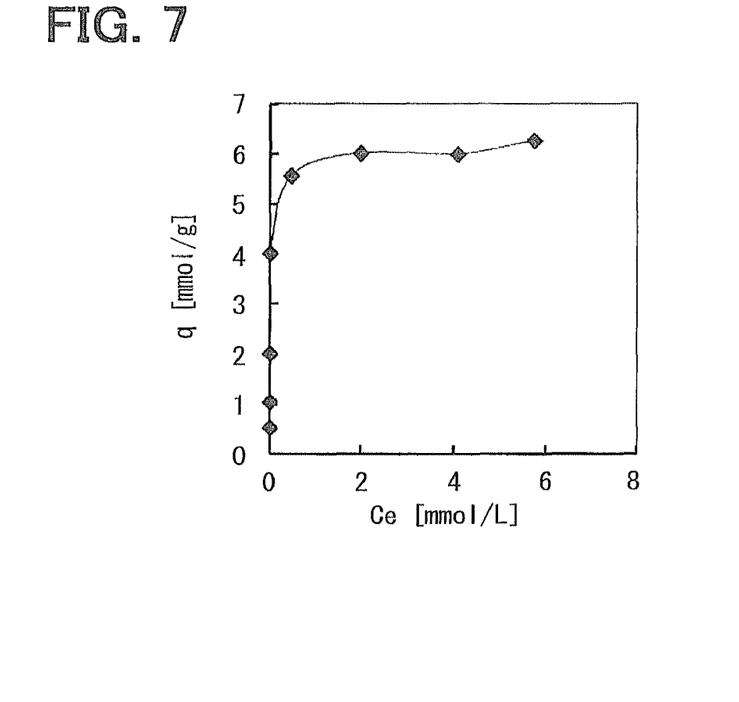
FIG. 7 is a graph illustrating an adsorption isotherm of gold(III) at 30 degrees Celsius when an adsorbent B of cotton processed with the concentrated sulfuric acid is used, according to the embodiment.

FIG. 7 is a graph illustrating an adsorption isothermal line of gold(III) at 30° C. of a case where the adsorbent B of the cotton processed with concentrated hydrochloric acid is used.

The detailed test conditions are as follows:
Hydrochloric acid concentration: 0.1 mol/L
Volume of hydrochloric acid: 10 mL
Weight (dry weight) of the adsorbent B: 10 mg
Shaking time: 96 hours
Temperature: 30° C.

Also in this case, the adsorption isothermal line indicates the Langmuir-type adsorption. The saturation amount of gold adsorbed to the adsorbent B is calculated 6 mol/kg based on the value of the amount of adsorption in a range where the amount of adsorption is fixed regardless of the concentration. This result indicates that 1.2 kg of gold is adsorbed to 1 kg of the adsorbent B.

Figure 8:
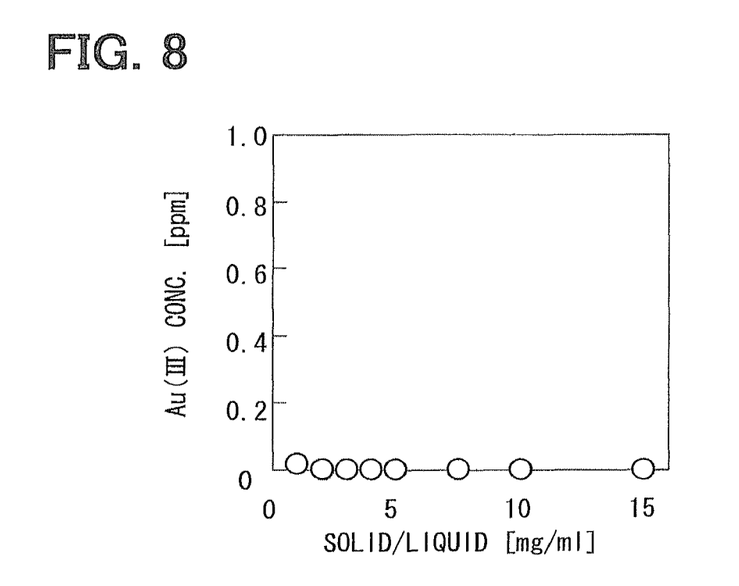
FIG. 8 is a graph illustrating a solid-liquid ratio of the adsorbent A and a residual concentration of gold according to the embodiment.

The adsorbent A is added to 0.25M hydrochloric acid containing gold(III) of thin concentration of 0.83 mg/L, and shaken for 24 hours at 30° C. to measure residual concentration of gold. Further, the measurement is carried out by varying the amount of the adsorbent A. FIG. 8 is a graph illustrating a relationship between a solid-liquid ratio (a ratio of the adsorbent A and hydrochloric acid) and the residual concentration of gold.

As a result, it is appreciated that the gold of thin concentration can also be quantitatively collected by adding 1 g of the adsorbent A to 1 L of a solution (hydrochloric acid).

Figure 9:
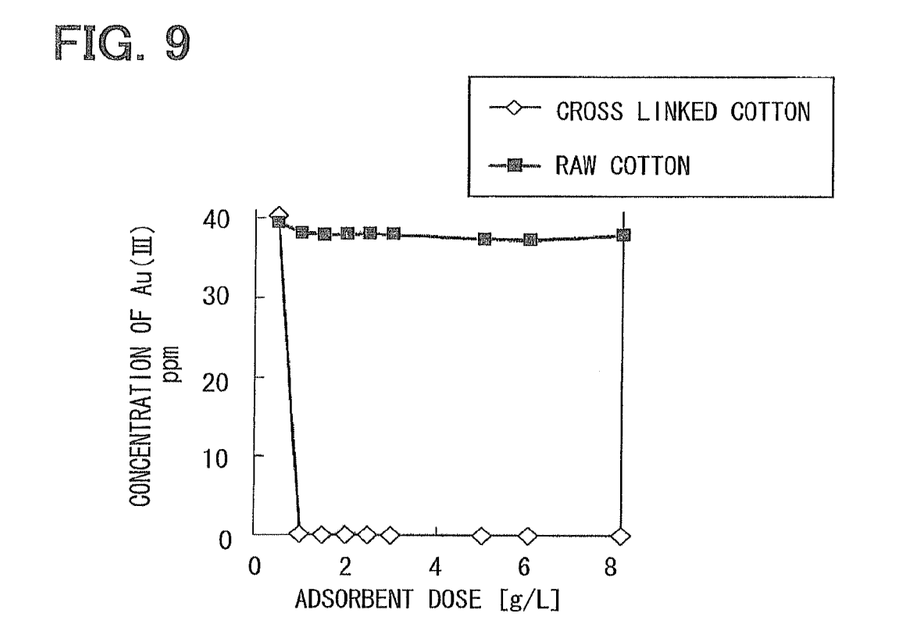
FIG. 9 is a graph illustrating a solid-liquid ratio of the adsorbent B and raw cotton and a residual concentration of gold according to the embodiment.

The adsorbent B is added to 0.1M hydrochloric acid containing 0.2 mM gold(III), and shaken for 24 hours. The residual concentration of gold is measured. The measurement is carried out by varying the amount of the adsorbent B.

Further, a similar measurement is carried out using raw cotton, which is not processed with concentrated sulfuric acid, in place of the adsorbent B of the cotton processed with the concentrated sulfuric acid.

FIG. 9 illustrates a relationship between the solid-liquid ratio (a ratio of adsorbent and hydrochloric acid). In FIG. 9, the result of the adsorbent B is illustrated by a line of "cross-linked cotton", and the result of the raw cotton is illustrated by a line of "raw cotton".

As shown in FIG. 9, it is appreciated that the gold can be quantitatively collected by adding approximately 1 g of the adsorbent B to the solution of 1 L, although gold is not adsorbed to the raw cotton.

<Generation of Particles of Solid Gold>

Figure 10A:
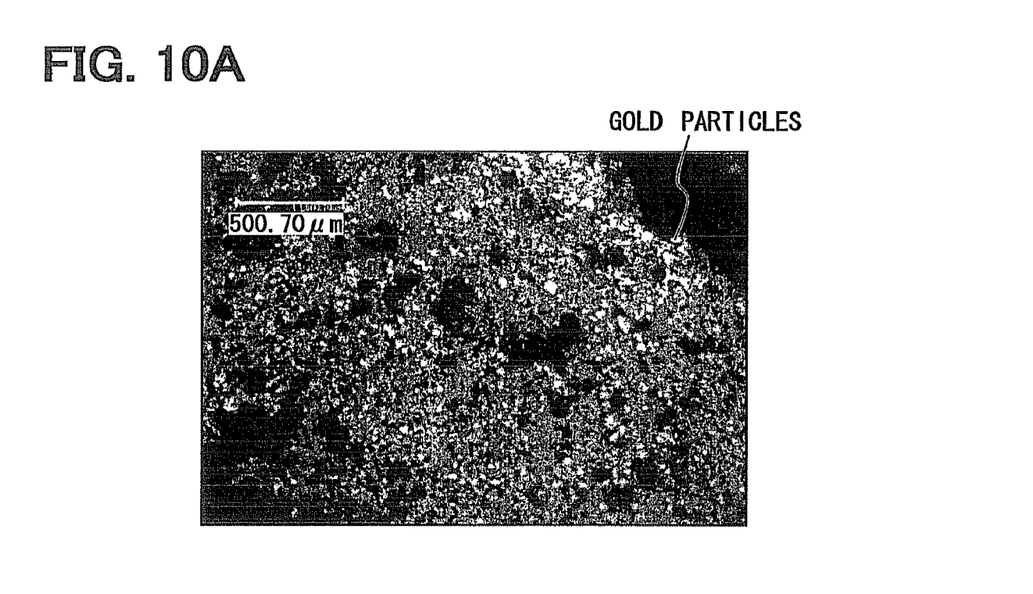
FIG. 10A is an optical micrograph of the adsorbent A after adsorption of gold according to the embodiment.
Figure 10B:
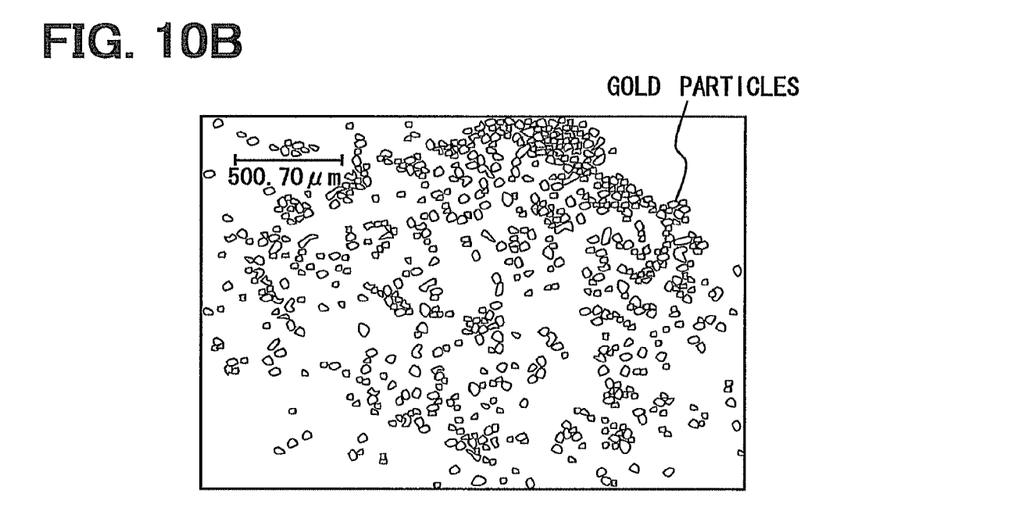
FIG. 10B is an illustrative view of the optical micrograph shown in FIG. 10A.

Gold is adsorbed to the adsorbent A in the above-described manner, and then the adsorbent A is extracted and dried. FIG. 10A illustrates an optical micrograph of the dried adsorbent A.

Figure 11A:
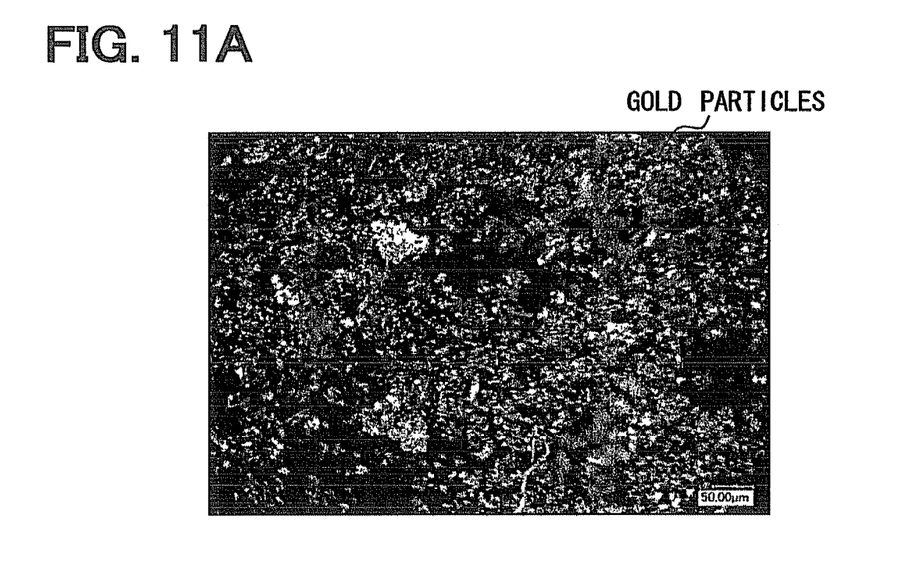
FIG. 11A is an optical micrograph of the adsorbent B after adsorption of gold according to the embodiment.
Figure 11B:
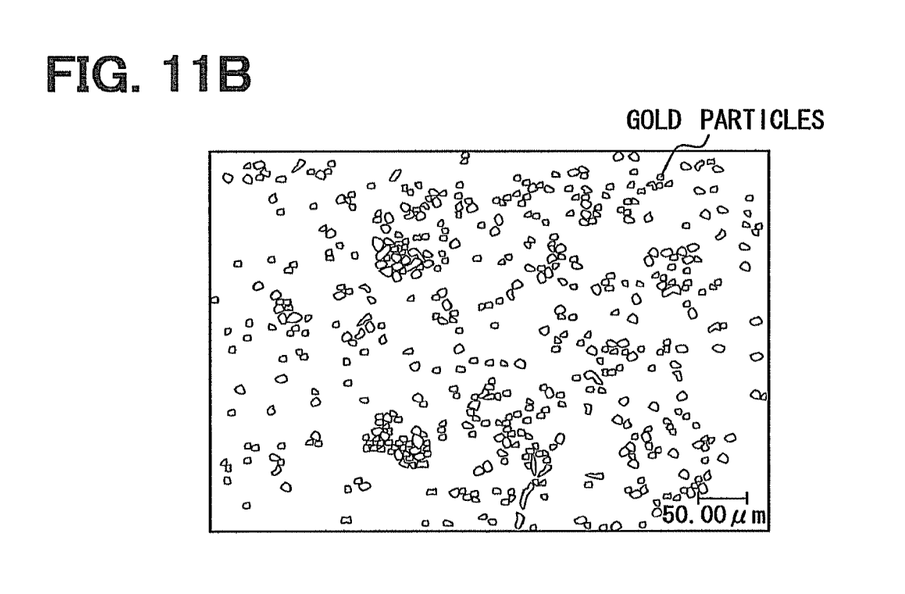
FIG. 11B is an illustrative view of the optical micrograph shown in FIG. 11B.

Further, gold is adsorbed to the adsorbent B in the above-described manner, and then the adsorbent B is extracted and dried. FIG. 11A illustrates an optical micrograph of the dried adsorbent B.

As shown in FIGS. 10A and 11A, it is considered that the gold(III) irons adsorbed to the respective adsorbents A, B are returned to elemental gold and grown into gold particles. Further, it is considered that the large amount of adsorption of gold in the adsorbents A, B as shown in FIGS. 6 and 7 is caused by such growth of gold particles.

In this case, the gold is collected in the form of gold particles, rather than the state of gold(III) ions. Therefore, the gold is easily collected.

The present disclosure is not limited to the above-described exemplary embodiments, but may be implemented in various other ways without departing from the spirit of the present disclosure.

For example, the adsorbent may be prepared using carbohydrates other than cotton. As an example, the adsorbent can be prepared using paper.

The adsorbents A, B may be prepared by carrying out the dehydration condensation cross-linkage reaction using strong acid other than sulfuric acid, such as hydrochloric acid.

Additional advantages and modifications will readily occur to those skilled in the art. The disclosure in its broader term is therefore not limited to the specific details, representative apparatus, and illustrative examples shown and described.

What is claimed is:

1. An adsorbent containing a carbohydrate having an ether linkage generated by a dehydration condensation cross-linkage reaction between a strong acid and the carbohydrate.

2. The adsorbent according to claim 1, wherein the ether linkage is formed by processing the carbohydrate with the strong acid at a temperature equal to or greater than 70 degrees Celsius, and the strong acid is one of concentrated sulfuric acid and hydrochloric acid.

3. The adsorbent according to claim 1, wherein the strong acid includes one of sulfuric acid and hydrochloric acid.

4. The adsorbent according to claim 1, wherein the carbohydrate is a cellulose.

5. The adsorbent according to claim 4, wherein the cellulose is one or more selected from the group consisting of cotton, hemp and paper.

6. A method of collecting a precious metal dissolved in a solution, comprising:
   adsorbing the precious metal to the adsorbent according to claim 1.

* * * * *